United States Patent [19]

Redding et al.

[11] Patent Number: 4,521,149
[45] Date of Patent: Jun. 4, 1985

[54] BALE HANDLING MACHINE

[75] Inventors: John R. Redding, 19 Wellfield Rd., Piddington, High Wycombe, Buckinghamshire; Patrick F. Hunter, Owlswick, both of England

[73] Assignee: John Robert Redding, High Wycombe, England

[21] Appl. No.: 432,907

[22] PCT Filed: Jan. 25, 1982

[86] PCT No.: PCT/GB82/00018
§ 371 Date: Sep. 27, 1982
§ 102(e) Date: Sep. 27, 1982

[87] PCT Pub. No.: WO82/02474
PCT Pub. Date: Aug. 5, 1982

[30] Foreign Application Priority Data

Jan. 26, 1981 [GB] United Kingdom ............... 8102305
Sep. 14, 1981 [GB] United Kingdom ............... 8127637

[51] Int. Cl.³ ............................................. A01D 87/12
[52] U.S. Cl. ................................. 414/44; 414/95; 414/111; 414/458
[58] Field of Search ............. 414/44, 111, 92, 95, 414/458, 721, 786, 24.5; 294/87 R

[56] References Cited

U.S. PATENT DOCUMENTS 3,949,886  4/1976  Harber et al. ............... 414/95 X
4,076,137  2/1978  Kucera ....................... 414/24.5 X
4,193,728  3/1980  Steketee ...................... 414/111 X
4,204,790  5/1980  Baxter ......................... 414/24.5

FOREIGN PATENT DOCUMENTS 249746    2/1964  Australia ..................... 414/111
1481049   1/1969  Fed. Rep. of Germany ... 414/721
1245974   9/1971  United Kingdom .......... 414/95
15200807  8/1978  United Kingdom .......... 414/111
1530267  10/1978  United Kingdom .......... 414/111
1548415   7/1979  United Kingdom .......... 414/111

Primary Examiner—Leslie J. Paperner
Attorney, Agent, or Firm—Keil & Weinkauf

[57] ABSTRACT

A machine for handling bales comprises a chassis frame (1,2,3) which can be raised or lowered by movement of wheels (16,17) relative to the frame. Bale engaging means which can be constituted by movable frame members (2,3) and/or gripping elements (9,10) attached thereto, are movable to engage and disengage a bale or group of bales. With the frame lowered, a bale or group of bales is engaged and then the frame is raised by the wheels to lift the bale(s) from the ground for transport. In a preferred embodiment, the distance by which the bales are raised permits them to be located over a second bale or group of bales. The first bale(s) can then be released from the bale engaging means to rest upon the second bale(s) and the frame lowered to permit the second bale(s) to be gripped and raised from the ground thereby permitting a stack of bales to be built up.

1 Claim, 4 Drawing Figures

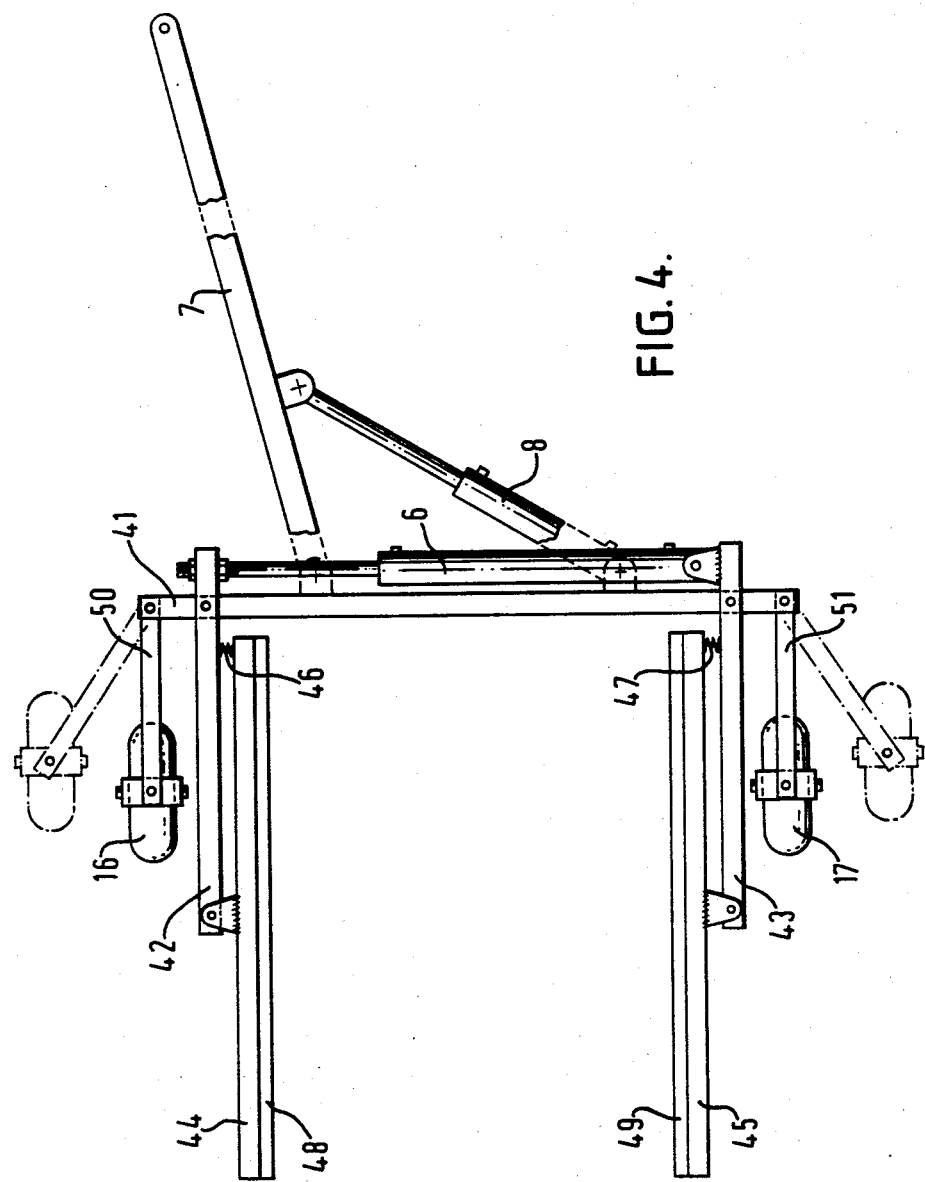

BALE HANDLING MACHINE

The present invention relates to a machine for picking up bales from the ground and transporting them to a location spaced from the pick-up location. It has particular, but not exclusive, application to the handling of agricultural bales, especially hay or straw bales.

In the operation of a conventional pick-up baler, hay or straw is picked up from the field and compressed into compact layers which are tied together to form bales. Usually, these bales are of an oblong rectangular shape of, for example, 18 inch width by 14 to 16 inch height by 20 to 26 inch or 36 to 44 inch length. The bales are dumped behind the baler, often arranged in a flat layer of 6 or 8 bales aligned in two rows. These bales are subsequently picked up by specialized tractor-mounted loaders and built up into a stack on a trailer.

It is known to provide a bale stacking machine which is drawn behind the baling machine to receive and stack bales as they leave the baler. Usually, these bale handling machines elevate two bales at a time to build the stack in which alternate layers are mutually perpendicularly arranged. When the required stack has been built up, it is released from the machine to await collection. Bale handling machines of this kind are described in, for example, UK Patent Specifications Nos. 1375042, 1495218 and 1504888. Such machines are relatively complicated in that they are required to automatically angularly displace alternate groups of bales and build and release the required stack.

It is an object to the present invention to provide a bale handling machine of relatively simple construction to facilitate the handling of bales. In particular, it is an object to provide a machine which, in its preferred embodiment, is capable of forming and transporting a stack of bale.

According to the present invention, there is provided a bale handling machine comprising;

a chassis frame defining a bale-receiving zone which is open from below;

ground engaging transport means for translational movement of the frame over the ground; and bale engaging means carried by or incorporated in the frame for supporting one or more bales in the bale-receiving zone for movement with the frame, characterised in that the ground engaging transport means is movable relative to the frame to lower and raise the frame between a lowered bale receiving position, in which the bale engaging means can engage one or more bales standing on the ground below the bale-receiving zone, and a raised bale transport position, in which the bale engaging means supports said one or more bales above the ground.

It will be appreciated that it is a simple matter to design a bale handling machine of the invention in which the ground engaging transport means can raise the frame from its lowered position to a height greater than the individual height of the bales. The machine can then pick-up a first bale or group of bales, place it on a second bale or group of bales, and then pick-up the resultant stack. This procedure can be repeated until the desired stack height has been reached.

It is preferred that the ground engaging transport means is articulated to the frame for arcuate movement to move the frame between its lowered and raised positions. However, said means can be mounted on the frame and moved in other ways. For example, said means can be movable vertically by jacks mounted on the frame. Usually, the ground engaging transport means will comprise two or more wheels although other means, for example skids, can be used as desired.

The machine can be self-propelled, attached to a tractor or other powered vehicle or, more usually, towed by a tractor or other towing vehicle. In order to facilitate manoeuvring of the machine, it is preferred that, in its towed embodiment, the draw bar is laterally offset relative to the centre line of the frame so that, at least during approach to the bale(s) the frame is offset from the towing vehicle. Conveniently, a stay extends between the frame and the draw bar to maintain the offset position. The stay can be adjustable in order to align the machine and towing vehicle as and when required, for example during movement of the machine to and from the field.

It is preferred that the frame has an open end to receive the bale(s) and especially that the frame is of generally U-shape. When the frame is of this preferred shape, the ground engaging transport means usually will comprise a pair of wheels spaced laterally apart at the closed end of the frame.

The bale engaging means can be any means which will support the bale(s) for movement with the frame. For example, said means can comprise a fork or platform adapted to slide beneath the bale(s) standing on the ground. However, it is preferred that said means comprises a pair of mutually horizontally opposed gripping elements which are relatively movable to grip and subsequently release one or more bales located between them. Conveniently, these gripping elements are mounted on or constituted by respective longitudinally extending members of the frame, which frame members are relatively movable to cause the gripping elements to grip the bale(s). When gripping elements are provided, they can be plates or bars between which the bale(s) is squeezed. It is preferred that such plates or bars are provided with one or more projections, for example, flanges or spikes, which penetrate the bale(s).

At least one, and preferably both of the relatively movable longitudinal frame members, can be movable laterally along a cross-member of the frame. In an alternative arrangement, at least one, and preferably both, of the longitudinal frame members is attached to a cross-member of the frame for pivotal movement about a vertical axis. In the latter case, it is preferred that the gripping elements are mounted on the longitudinal frame members in such a manner that the elements remain mutually parallel.

It is particularly preferred that the frame of the bale handling machine is generally U-shaped having a pair of mutually opposed longitudinally frame members joined by a frame cross-member and each of the longitudinal frame members carries or constitutes a respective gripping element and is movable relative to the cross-member. If desired, a fixed third longitudinal frame member can be provided which extends parallel to and is spaced between the movable longitudinal frame members and carries or constitutes a respective gripping element on each side thereof. The purpose of this third frame member is to penetrate the cleavage of a group of bales arranged in rows and thereby provide increase stability in a machine intended to handle groups of bales.

As mentioned previously, it is preferred that the extent to which the ground engaging transport means can raise the frame from its lowered position is greater than the individual height of the bales which the machine is intended to handle. In such a case, the machine can place a transported bale onto a bale standing on the ground and subsequently raise and transport the resultant stack of bales. In order to retain the stack of bales in the machine, it is preferred that side wall members, for example side frames, are provided.

The invention also provides a method of forming the stack of bales using the machine of the invention in which the ground engaging transport means can raise the frame from its lowered position by an amount greater than the individual height of the bales. The method comprises manoeuvring the machine to pick-up a first bale or group of bales from the ground below the bale-receiving zone; manoeuvring the machine with the frame in its raised position and said bale(s) carried by the bale engaging means so that said bale(s) overlie a second bale or group of bales on the ground; releasing the bale engaging means to cause the first bale(s) to rest upon the second bale(s); lowering the frame to its lowered position; engaging the second bale(s) with the bale engaging means; raising the frame in its raised position; and, if required, picking up subsequent bales or groups of bales in the same manner as said second bale(s) until the required stack is formed. The method is particular of use in picking up groups of bales arranged in two or more rows, in which case alternate groups will be approached at mutually perpendicular horizontal directions whereby alternate layers of the stack are perpendicularly disposed.

The ground engaging transport means and bale engaging means can be moved manually by, for example, screw jacks or the like. However, said means usually will be power operated, preferably using hydraulic rams. The power source can be the engine of a self-propelled machine or the power take-off of a towing or other support vehicle.

The machine of the invention is primarily intended for the handling of oblong rectangular bales of hay or straw. However, it can be used to handle bales of other shapes and/or materials. Its use is not limited to agricultural use; in particular, it can be used in docks, depots or warehouses for the handling of bales of jute or other materials. Further, the machine readily can be adapted to handle other articles, especially those of a stackable nature and/or parallelepipal shape.

The following is a description, by way of example only and with reference to the drawings, of two presently preferred embodiments of the invention. In the drawings:

FIG. 4 is a plan view (with some detail omitted) of a second presently preferred embodiment of the invention.

Figure 1:
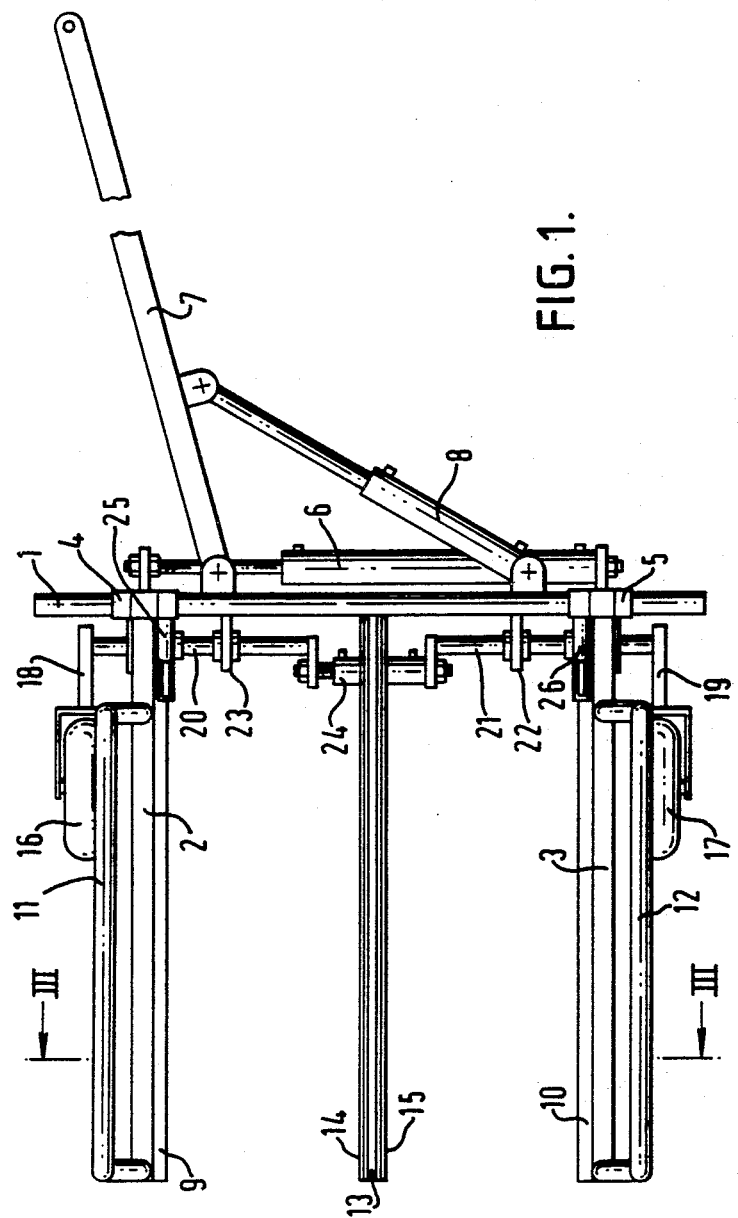
FIG. 1 is a plan view of a bale handling machine in accordance with one presently preferred embodiment of the invention.
Figure 2:
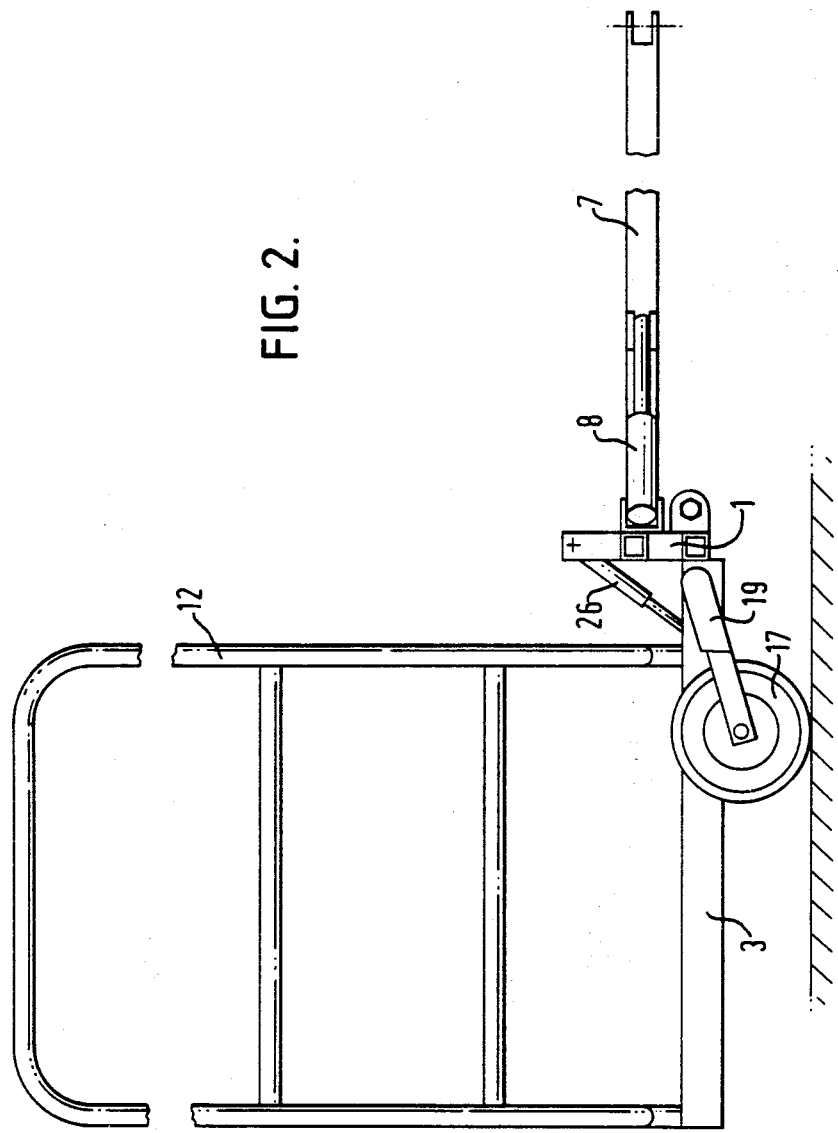
FIG. 2 is a side view of the machine of FIG. 1.
Figure 3:
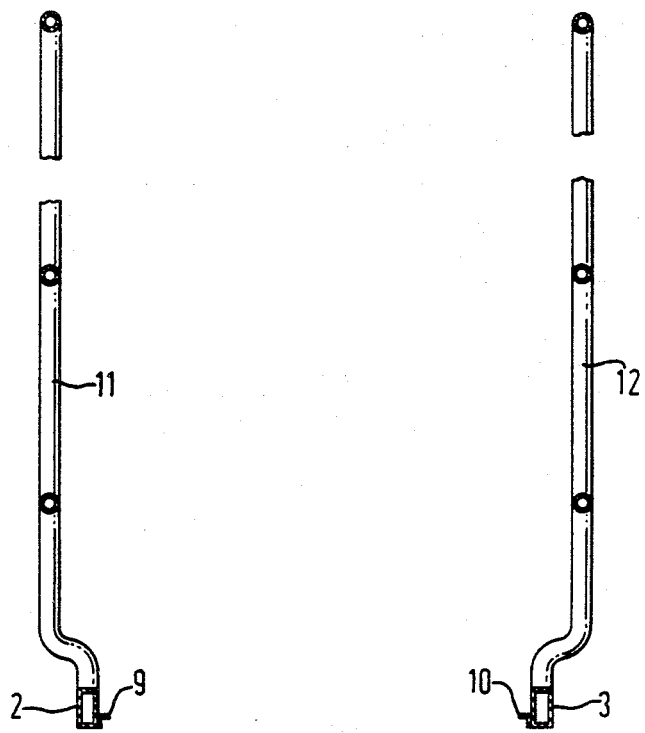
FIG. 3 is a view on the line III—III of FIG. 1 but omitting the central locating bar (13)

Referring first to FIGS. 1, 2 and 3, a bale handling machine comprises a generally U-shaped chassis frame having a cross-member 1 and a pair of mutually opposed longitudinal frame members 2, 3. The longitudinal frame members 2, 3 are slidably mounted on the cross-member 1 by respective collars 4, 5. A hydraulic ram 6 acts between forwardly extending lugs carried by the collars 4, 5 to adjust the lateral spacing between the frame members 2, 3.

An offset draw bar 7 is pivotally attached to the cross-member 1 and a second hydraulic ram 8 is provided to adjust the angle which the draw bar subtends to the cross-member. This ram 8 is pivotally attached at one end to a position on the cross member 1 spaced from the point of attachment of the draw bar 7. The other end of the ram 8 is pivotally attached to the draw bar 7 at a position spaced from the frame member.

Gripper projections in the form of longitudinally extending inwardly projecting flanges 9, 10 are provided on the frame members 2, 3 respectively. Side frames 11, 12 extend upwardly from frame members 2, 3 respectively and, as clearly seen in FIG. 3, the uprights of these frame members are bent at their lower ends so that the side frames are positioned slightly upwardly of the frame members 2, 3.

Optionally, a central locating bar 13 extends rearwardly from the centre of the cross-member 1. This bar is provided on respective sides thereof with longitudinally extending gripping flanges 14, 15 similar to flanges 9, 10.

The frame is supported by a pair of wheels 16, 17 carried by arms 18, 19 respectively, which arms are rigidly mounted on axles 20, 21 for pivotal movement therewith. The axles are guided in guides 22, 23 extending rearwardly from the cross-member 1. A hydraulic ram 24 interconnects the axles 20, 21 whereby the distance between the wheels 16, 17 can be adjusted.

The wheels 16, 17 can be raised and lowered relative to the frame by pivotal movement of the axles 20, 21. This movement is effected by hydraulic rams 25, 26 which act in unison and extend between the collars 4, 5 and rearwardly extending projections on the axles.

In use, the draw bar 7 is attached to a tractor and the rams 6, 8, 24, 25 and 26 are connected to the hydraulic take-off of the tractor. When the machine is being moved on the road or otherwise is in a transport mode, the ram 8 is adjusted to hold the draw bar 7 in a position whreby the machine is essentially in line with the tractor. When it is desired to pick-up bales from the field, the ram 8 will be extended so that the machine is offset relative to the tractor thereby facilitating manoeuvring of the machine to pick-up the bales.

With the frame members 2, 3 spaced widely apart, the machine is backed so that a flat group of eight bales arranged in two rows is received between the frame members. When the centre locating bar 13 is present, it will extend through the cleavage between the rows or, when the machine approaches in a direction perpendicular to the rows, between the two groups of four bales. With the bales located between the frame members 2, 3, the rams 25, 26 are then operated to pivot the axles 20, 21 thereby lowering the frame to its lowered position. In this position, the ram 6 is operated to draw the frame members 2, 3 together and thereby squeeze the bales between said members or, when the centre locating bar 13 is present, between the frame members and that bar. With the bales thus engaged in the machine, the rams 25, 26 are moved again to raise the frame from the ground. The distance through which the frame travels is slightly greater than the height of the bales from the ground.

The machine is then towed by the tractor to a second group of bales. This group is approached in a direction mutually perpendicular to the first group of bales and the machine manoeuvred until the first group are located above the second group. The ram 6 is then expanded to release the first group of bales to rest upon the second group. Subsequent operation of the rams 25, 26 again lowers the frame so that the second group of bales can be squeezed between the frame members 2, 3 and, if present, the centre locating bar 13. Further operation of the rams 25, 26 will raise the frame to allow the machine to be moved to a third group of bales.

The procedure described above is repeated until the required stack of bales is formed in the machine. The stack can then be transported by the machine to a required temporary or permanent storage position.

The spacing between the wheels 16, 17 is adjustable by the ram 24. This permits the wheels to be relatively widely spaced apart during the collection and stacking of bales but to be moved inwardly as and when required, for example during operation on public roads or passage through narrow gateways.

The principle difference between the embodiment of FIG. 4 and that of FIGS. 1, 2 and 3 is that the longitudinal frame members 42, 43 are pivoted to the cross-member 41 and carry gripper bars 44, 45. These bars 44, 45 are pivotally mounted at the rear ends of the frame members 42, 43 for movement about vertical axes and springs 46, 47 act between the forward ends of the bars and the respective frame members. The springs serve to keep the bars mutually parallel when gripping bales. Longitudinally extending flanges 48, 49 extend inwardly from the bars in the same manner as flanges 9 and 10.

In the embodiment of FIG. 4, the wheels 16, 17 are carried by arms 50, 51 pivotally attached to the ends of the cross-member 41 for movement about vertical axes to adjust the spacing between them (as shown by the ghost lines in FIG. 4). The mounting of the arms 50, 51 on the cross-member 41 also permits pivotal movement of the arms about a horizontal axes and the position of the arms relative to that axis is adjusted by hydraulic rams (not shown).

The operation of the machine of FIG. 4 is essentially the same as that of the machine of FIGS. 1, 2 and 3 and hence will not be described.

Typically, the machine of FIGS. 1, 2 and 3 has a cross bar 1 of 9 ft. length and the distance between the frame members 2, 3 is adjustable between 7 and 9 ft. The spacing between the wheels is adjustable between 7 ft. 4 ins. and 9 ft. 6 ins. The length of the frame members 2, 3 is 10 ft. and the height of the side frames is 12 ft. The vertical distance moved by the frame on movement of the wheels is about 16 inches. The dimensions of a typical machine of FIG. 4 correspond. It will be appreciated however that these dimensions are not critical and will be determined having regard to the size of the bales or group of bales with which the machine is intended to operate. If desired, the machine can be adapted to accommodate on the same level two or more bales or groups of bales picked-up at different locations.

It also will be appreciated that the invention is not restricted to the particular details described above with reference to the drawings and that numerous modifications and variations can be made to those details without departing from the scope of the invention as claimed in the following claims. For example, additional wheels can be provided at the free ends of the longitudinal frame members (2, 3 or 44, 45) and/or caster wheels can be used. Further the side frames (11, 12) can be telescopic and/or mounted separately of the movable frame members (2, 3 or 44, 45), and/or secured together at their support ends by one or more tie bars. Moreover, the draw bar 7 could be replaced by a direct coupling to the front or rear of a tractor. Other modifications and variations will be readily apparent to those skilled in the art of bale handling.

We claim:

1. A bale handling machine comprising:

a generally U-shaped chassis frame having a pair of laterally spaced arms extending rearwardly from a forward cross-member to define a bale-receiving zone which is open from below and has an open rear end to receive a group of bales and closed forward end;

a tow bar extending forwardly from said cross-member and adapted for connection to a towing vehicle;

a pair of laterally spaced wheels supporting said frame above the ground for translational movement of the frame and movable relative to the frame to lower and raise the frame between a lowered bale-receiving position and a raised bale-transport position;

a pair of mutually horizontally opposed gripping elements mounted on respective arms of the frame, said gripping elements being relatively movable to grip and subsequently release bales located between them;

the said wheels being at the forward end of the frame and spaced rearwardly of the cross-member by a distance less than the length of the tow bar, and the vertical distance moved by the wheels relative to the frame being at least 14 inches and greater than the individual height of the bales which the machine is intended to handle, whereby the machine can place a transported bale onto a bale standing on the ground and subsequently raise and transport the resultant stack of bales.

* * * * *